United States Patent
Crue et al.

(10) Patent No.: US 6,452,742 B1
(45) Date of Patent: Sep. 17, 2002

(54) THIN FILM WRITE HAVING REDUCED RESISTANCE CONDUCTOR COIL PARTIALLY RECESSED WITHIN MIDDLE COAT INSULATION

(75) Inventors: Bill Crue, Pittsburgh, PA (US); Ronald A. Barr, Mountain View, CA (US); Zhupei Shi, San Jose, CA (US); Mark Thomas, Hollister, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/388,775

(22) Filed: Sep. 2, 1999

(51) Int. Cl.⁷ .............................. G11B 5/31; G11B 5/17
(52) U.S. Cl. ...................................... 360/126; 360/123
(58) Field of Search ............................. 360/317, 126, 360/119, 123

(56) References Cited

U.S. PATENT DOCUMENTS

| | | |
|---|---|---|
| 3,908,194 A | 9/1975 | Romankiw |
| 3,968,565 A | 7/1976 | Bertens et al. |
| 4,375,657 A | 3/1983 | Brock et al. |
| 4,639,289 A | 1/1987 | Lazzari |
| 4,684,438 A | 8/1987 | Lazzari |
| 4,860,140 A | 8/1989 | Momata et al. |
| 4,872,079 A * | 10/1989 | Roberts ..................... 360/126 |
| 4,899,434 A | 2/1990 | Roberts |
| 4,933,209 A | 6/1990 | Anthony et al. |
| 5,034,089 A | 7/1991 | Dee et al. |
| 5,059,278 A | 10/1991 | Cohen et al. |
| 5,065,270 A | 11/1991 | Koyanagai et al. |
| 5,113,300 A * | 5/1992 | Ikeda et al. ................. 360/126 |
| 5,155,646 A * | 10/1992 | Fujisawa et al. ............ 360/126 |
| 5,438,747 A | 8/1995 | Krounbi et al. |
| 5,448,822 A | 9/1995 | Wu et al. |
| 5,452,164 A | 9/1995 | Cole et al. |
| 5,566,442 A | 10/1996 | Gaud et al. |
| 5,666,717 A | 9/1997 | Matsumoto et al. |
| 5,729,887 A | 3/1998 | Irie |
| 5,734,534 A | 3/1998 | Yamamoto et al. |
| 5,779,923 A | 7/1998 | Krounbi et al. |
| 5,843,521 A | 12/1998 | Ju et al. |
| 5,856,898 A | 1/1999 | Ohashi |
| 6,043,959 A * | 3/2000 | Crue et al. ................... 360/113 |
| 6,151,194 A * | 11/2000 | Steinbrecher ................ 360/126 |
| 6,191,918 B1 * | 2/2001 | Clarke et al. ................ 360/126 |

FOREIGN PATENT DOCUMENTS

| | | | |
|---|---|---|---|
| JP | 62-047812 | * | 3/1987 |
| JP | 63-121109 | * | 5/1988 |
| JP | 5-242430 | * | 9/1993 |

* cited by examiner

*Primary Examiner*—William Klimowicz
(74) *Attorney, Agent, or Firm*—Carr & Ferrell LLP

(57) ABSTRACT

In a preferred embodiment, a thin film write head having upper and lower pole structures. In the preferred embodiment of the present invention, a middle coat insulation layer is located over a yoke of the lower pole structure and adjacent a pedestal pole tip of the lower pole structure. A trench is formed in the middle coat layer by etching part way into the middle coat layer. A conductor coil is formed on the middle coat so that a portion of the coil is located within the trench and a portion above the trench. Preferably, the middle coat is planarized and then etched using a resist mask to form the trench. With one method, the resist mask is removed after etching the trench, a conductor seed layer deposited, a resist mask formed on the seed layer, a conductor coil formed within the mask, and the seed layer etched after resist mask removal to electrically isolate the turns of the coil. In another method, after trench etching and resist mask removal, conductor material may be deposited on the middle coat and planarized to form the portion of the coil within the trench. With this method, additional conductor material is deposited on the conductor material in the trench using a resist mask to form the coil. The additional conductor material provided in the trench can significantly reduce the coil resistance without increasing stack height or yoke lengths to improve write head performance.

18 Claims, 4 Drawing Sheets

THIN FILM WRITE HAVING REDUCED RESISTANCE CONDUCTOR COIL PARTIALLY RECESSED WITHIN MIDDLE COAT INSULATION

BACKGROUND

Data is stored on magnetic media by writing on the magnetic media using a write head. Magnetic media can be formed in any number of ways, such as tape, stripe, floppy diskette, and hard disk. Writing involves storing a data bit by utilizing magnetic flux to set the magnetic moment of a particular area on the magnetic media. A typical thin film write head is disclosed in U.S. Pat. No. 5,452,164, by Cole et al., entitled THIN FILM MAGNETIC WRITE HEAD, issued Sep. 19, 1995, herein incorporated by reference in its entirety. The state of the magnetic moment or bit transition is later read, using a read head, to retrieve the stored information.

An important goal of the magnetic storage industry is to improve data density and data rate. For higher data rates it is necessary to minimize write head inductance. One way to accomplish this is to minimize the number of coil turns.

To improve data density, reduced size write head structures and high coercivity media are used. High data density, then, requires high flux to write to the high coercivity magnetic media. To generate higher flux for higher data rates, it is necessary to provide higher current through the turns to provide sufficient magnetomotive force or MMF.

At higher currents, low coil resistance becomes important to reduce power loss and to limit resistive heating. As such, it is necessary to keep the resistance of the coil low. Conventional structure and processes, however, limit reduction of coil resistance to provide high density, in excess of 12 $Gb/in^2_1$, at high data rates, in excess of 700 Mb/sec.

SUMMARY

With a preferred embodiment of the present invention, a thin film write head is provided having a lower pole structure with a yoke and a pedestal pole tip, and having an upper pole structure with a pole tip opposing the lower pedestal pole tip across a write gap layer.

In the preferred embodiment of the present invention, a middle coat insulation layer is located over the yoke of the lower pole structure and adjacent the pedestal pole tip. A trench is formed in the middle coat layer by etching part way into the middle coat layer. A conductor coil is formed on the middle coat so that a portion of the coil is located within the trench and a portion above the trench.

In one preferred embodiment and method of fabrication, the middle coat is planarized and then etched using a resist mask to form the trench. With one preferred embodiment and method of fabrication, after etching the trench, the resist mask is removed and a conductor seed layer deposited on the middle coat. The coil turns are formed within a resist mask formed on the seed layer. The seed layer is etched after resist mask removal to electrically isolate the turns of the coil.

In another preferred embodiment and method of fabrication, after trench etching, conductor material may be deposited on the middle coat and planarized to form the portion of the coil within the trench. A resist mask may be formed and additional conductor material deposited within to form the portion of the coil above the trench.

In a typical embodiment, the trench is formed in the middle coat such that the additional conductor material in the trench added to the coil provides at least a 5% to 10% reduction in the resistance of a coil than without the addition conductor material in the trench. In more preferred embodiments, addition of conductor material in the trench typically provides at least 20% to 30% lower coil resistance.

This allows lower coil resistance without increasing stack height or yoke lengths to improve write head performance.

DESCRIPTION OF PREFERRED EMBODIMENTS AND METHODS OF THE PRESENT INVENTION

Figure 1:
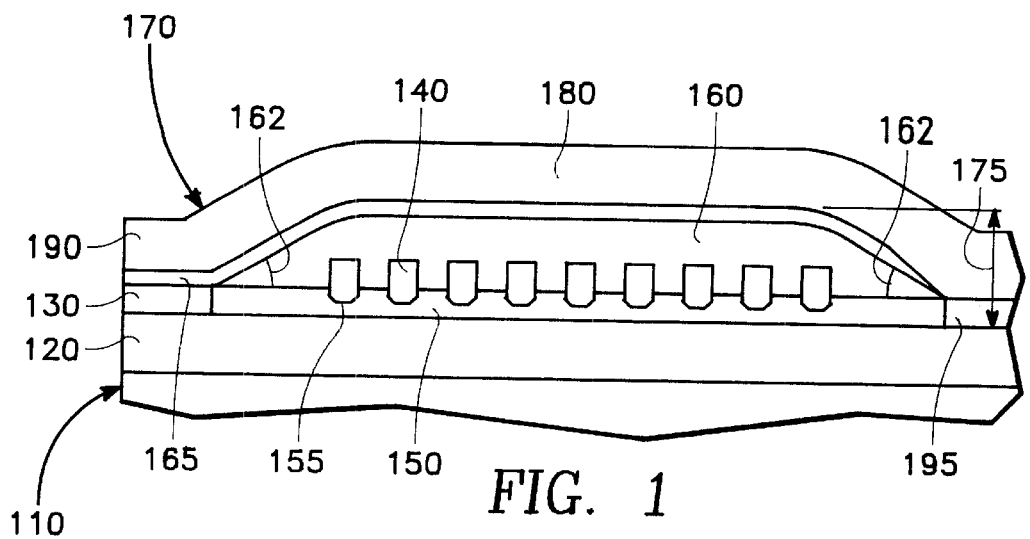
FIG. 1 is a cross sectional side view of a preferred embodiment of a thin film write head in accordance with the present invention.

FIG. 1 shows a preferred embodiment of the thin film write head of the present invention. The embodiment of FIG. 1 has upper and lower pole structures 170 & 110, formed of yoke portions 120 & 180, respectively. In the preferred embodiment of FIG. 1, the lower pole structure is provided with a separate pedestal pole tip 130, while the upper pole structure 170 is provided with an integral pole tip 190. It is possible in some embodiments to provide a integral lower pedestal pole tip 130. With the preferred embodiment, the zero throat height and track width of the pole tips may be defined as disclosed in U.S. patent application Ser. No. 09/289,701, by Rottmayer et al., entitled THIN FILM WRITER FOR HIGH DENSITY APPLICATIONS AND METHOD OF FABRICATION, filed on Apr. 9, 1999, now abandoned incorporated by reference in its entirety.

In the embodiment of FIG. 1, a portion of a conductor coil 140 is formed in a trench 155 etched from a planarized middle coat 150 so that the coil 140 is partially recessed within the middle coat 150. Partially recessing the coil 140 within the trench 155 has the advantage of providing additional conductor material to the turns of the coil 140 to lower coil 140 resistance without raising the height of the yoke 180 and increasing its length.

It is possible to lower the resistance of a coil by depositing more conductor material on top of it, but this would raise the stack height 175. Raising the stack height limits the data rate of the head by increasing the flux path length and yoke inductance. Furthermore, raising the stack height degrades process control, such as the ability to control the track width of the writer, due to difficulties with masking and etching at disparate surface heights. In addition, raising the stack height 175 may result in large apex angles 162. This limits upper yoke 170 material selection, as high moment materials do not perform well when sputtered on steep sloping surfaces Large apex angles 162. Although top coat insulation 160 thickness could be reduced to maintain coil stack height 175 when depositing additional conductor material on top of the coil, such a solution increases the chance of shorting between the coil 140 and the yoke 180, thus decreasing the reliability of the device.

Furthermore, although increasing coil width to increase coil 140 resistance would reduce coil resistance without increasing stack height 175, this option is limited by processing constraints, such as equipment and material tolerances. Thus, if the coil is made wider, the pitch increases, increasing the yoke 180 length. Thus, for a given yoke 180 length, it is not possible to further increase the coil 140 width of conventional write heads. By insetting the coil 140 into the middle coat insulating layer 150, however, the preferred embodiment of the present invention allows the resistance to be reduced without increasing yoke 180 length.

The coil structure of the preferred embodiment of FIG. 1, allows the lower pedestal pole tip 130 and middle coat 155 to be planarized prior to fabricating the low resistance coil 140. Although it is possible to fabricate the coil on an unplanarized thin insulation layer on the lower yoke 120, this does not provide as favorable results as the preferred embodiment. If the lower pedestal pole tip 130 and back gap 195 are formed first, the coil would be formed at the bottom of a large hole. Although possible, it is difficult to fabricate a very high density coil in the bottom of a hole. As such, the preferred embodiment provides reduced disparity of surface features to facilitate coil formation.

With the preferred embodiment, trench 155 are etched from the middle coat insulation 150 after the middle coat 150 and lower pedestal pole tip 130 are planarized. The trench 155 extends only part way into the planarized middle coat 150. The coil 140 is formed so that a portion is formed within the trench 155. Although this approach does not eliminate the topography prior to coil formation, it reduces it, and it also allows planarization of the middle coat surface prior to etching and deposition of coil material for coil formation.

In this embodiment and others, planarization of the middle coat material and the lower pedestal pole tip 130 is an absolute requirement to the functionality of the write head. Because in the preferred embodiment the overall height of the coil is greater than the height of the lower pedestal pole tip 130 and of the middle coat 150, which are about one micron high in one preferred embodiment, planarization of the lower pedestal pole tip 130 after deposition of the coil is not possible.

As such in some preferred embodiments, the trench 155 is formed about half way into the planarized middle coat 150. In one preferred embodiment, this adds about a half of a micron to the height of the coil turns. Such an increase in height can potentially drop the resistance of the coil by about 4 or 5 ohms, without increasing the yoke lengths. Such an increase in coil height in an embodiment with an 18 ohm write coil may provide about 20%–30%, or more, reduction in resistance. In a typical embodiment, the trench 155 is formed in the middle coat 150 such that the additional conductor material in the trench 155 added to the coil 140 provides at least a 5% to 10% reduction in the resistance of a coil than without the addition conductor material in the trench 155. In more preferred embodiments, the combination of the conductor material located in the trench 155 to the conductor material located above the top of the trench 155 provides a 20% to 30% lower resistance than without the addition of the conductor material in the trench 155.

Partially recessing the conductors also provides additional middle coat adjacent the coil to sink heat generated by the coil. As the middle coat may be formed of Alumina, $SiO_2$, or other inorganic material, it can provide better heat dispersal than can top coat insulation layer 160, which is typically formed of cured photoresist. This can reduce stresses caused by thermal expansion to improve reliability of the write head. Further, better heat dispersal inhibits heat from building up and increasing the electrical resistance of the coil.

Figure 2:
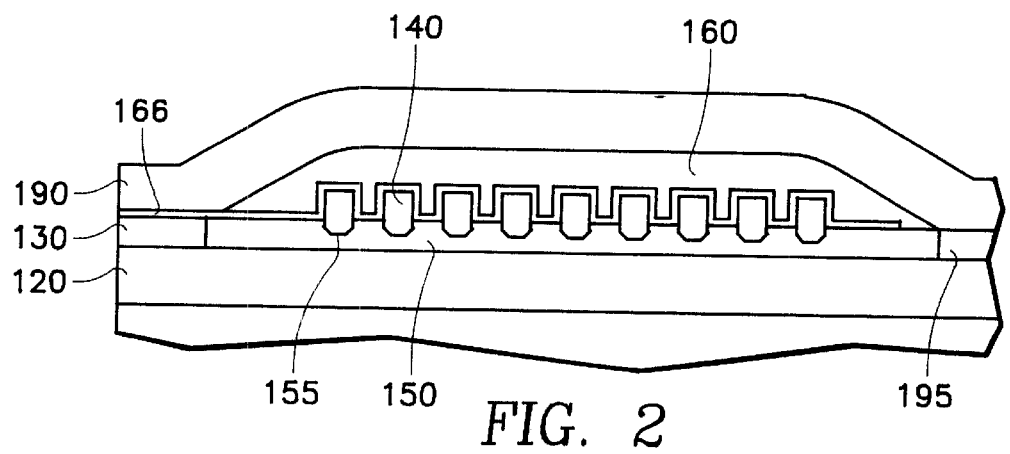
FIG. 2 is a cross sectional side view of a preferred embodiment of a thin film write head in accordance with the present invention.

The write gap layer 165 may extend over or under the top coat insulation layer 160. One advantage of placing the write gap layer 165 under the insulation 160 is that the write gap layer 165 typically is formed of inorganic insulation with higher resistance than the top coat insulation layer 160. As such, the write gap 165 may extend between the coil turns to provide increased resistance between the turns to inhibit shorting between adjacent coil turns, as shown in FIG. 2.

Figure 3:
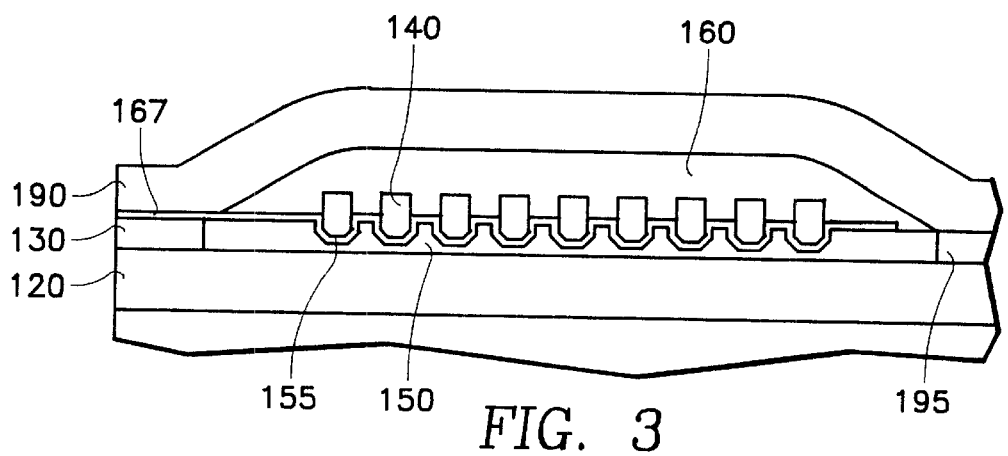
FIG. 3 is a cross sectional side view of a preferred embodiment of a thin film write head in accordance with the present invention.

It is also possible in some embodiments, to form the write gap layer under the coil 140, if desired. For example, the write gap layer 165 may be formed under the middle coat 150, such as on the planarized middle coat prior to etching the trench 155, or on the middle coat after etching the trench 155 as shown in FIG. 3.

Figure 4:
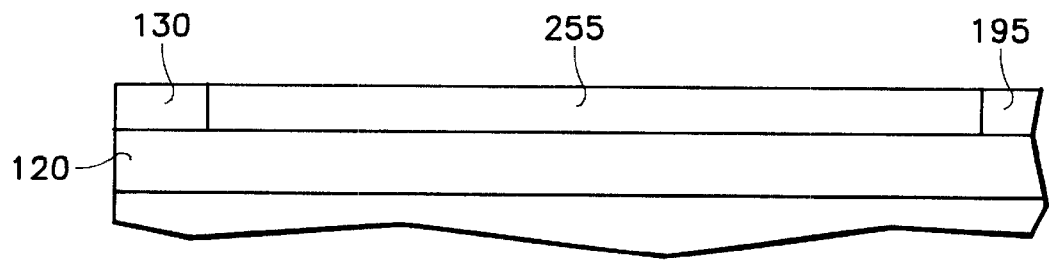
FIG. 4 is a cross sectional side view of a partially fabricated thin film write head in accordance with the present invention.
Figure 5:
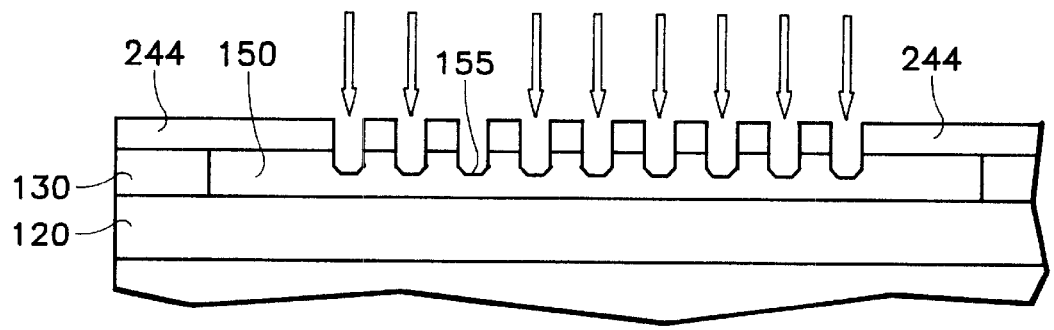
FIG. 5 is a cross sectional side view of a partially fabricated thin film write head in accordance with the present invention.

Turning to FIG. 4, in a preferred method of fabrication, the lower pedestal pole tip 130 and back gap 195 may be formed on the lower yoke 120 by masking and etching. Insulative material thereafter may be deposited to form the middle coat layer 255. In preferred embodiments, the middle coat is formed of inorganic insulative material, such as alumina, $SiO_2$, or the like. The top surfaces of the lower pedestal pole tip 130, the middle coat layer 255, and the back gap are planarized, such as by chemical mechanical polish or CMP. Turning to FIG. 5, a resist structure 244 is formed on the middle coat. The middle coat 255 is etched using the resist mask and dry or wet techniques, such as for example ion milling, to form a trench 155 in middle coat 150.

Figure 6:
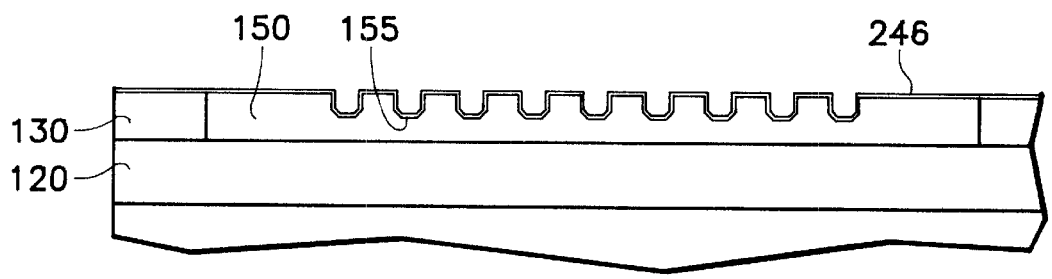
FIG. 6 is a cross sectional side view of a partially fabricated thin film write head in accordance with the present invention.

Turning to FIG. 6, in the preferred method, the resist structure is stripped and a conductor seed layer 246 deposited on the etched middle coat 150. The seed layer may be formed by sputtering, or by CVD or chemical vapor deposition, or by any technique known in the art, and is typically Cu, Au, Ag, or other good conductor.

Figure 7:
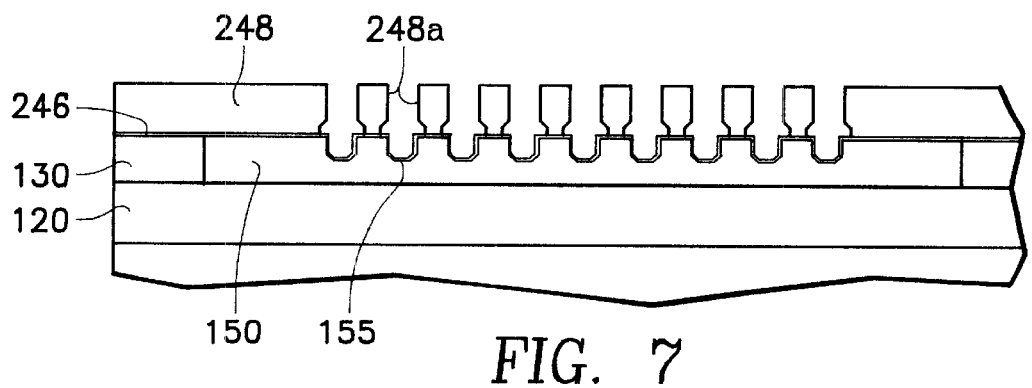
FIG. 7 is a cross sectional side view of a partially fabricated thin film write head in accordance with the present invention.
Figure 8:
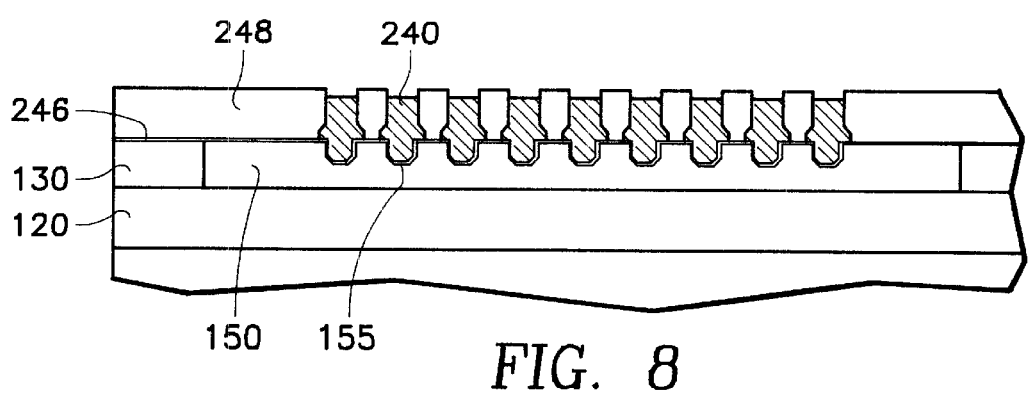
FIG. 8 is a cross sectional side view of a partially fabricated thin film write head in accordance with the present invention.

Turning to FIGS. 7 & 8, a resist structure 248 is formed on the seed layer 246. The resist structure 248 is formed so that its sidewalls are generally aligned with the previously etched trench 155. In the preferred method, a bilevel resist structure may be used to minimize the impact of the topography created by the trench 155. Conductive material is deposited within the resist pattern by plating to form the turns of the coil 240.

In some embodiments, because registration errors may cause misalignment of the resist mask 248 over the trench 155, the sidewalls of the coil in the trench 155 may not be completely aligned with the sidewalls of coil above the trench 155. In such embodiments, it is only necessary that the sidewalls generally be aligned so as prevent shorting between adjacent turns of the coil 140.

After plating, the resist mask 248 is removed and the exposed portions of the seed layer 246 etched to electrically isolate the turns of the coil. It is presently preferred to remove the seed by ion milling, although other dry or wet etch methods may be utilized.

Figure 9:
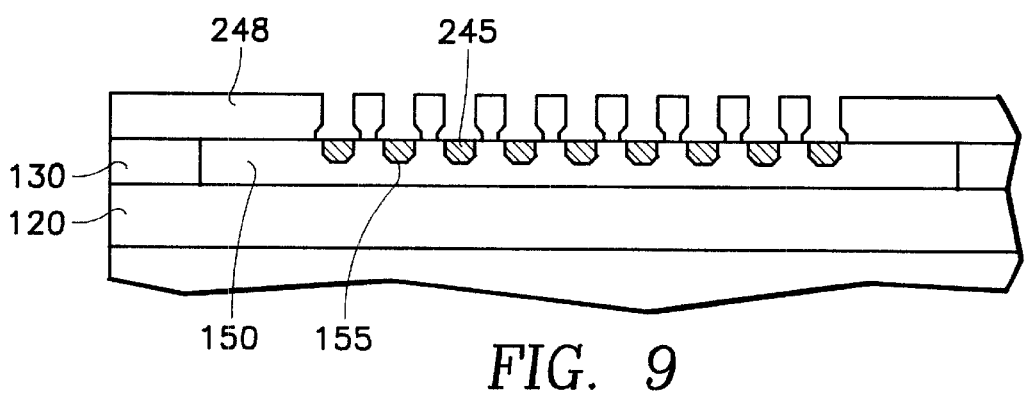
FIG. 9 is a cross sectional side view of a partially fabricated thin film write head in accordance with the present invention.

Turning to FIG. 9, it is possible with some embodiments, to completely fill the trench 155 with conductive material, such as by plating, and then to planarize down to the middle coat 150 to isolate the turns of conductive material 245. After planarization, a resist structure 248 is formed and additional conductor material deposited on the planarized conductor material 245 in the trench 155. As such, with this method and embodiment, the coil is fabricated in two sections, one section 245 which is inset into the middle coat 150 and one section (not shown) which sits on the inset section 245.

With such an embodiment, it is not necessary to form insulation between upper and lower sections of the coil. With this embodiment, the resist structure 248 should be generally aligned so that shorting between the top and bottom sections of adjacent coil turns is inhibited.

With preferred methods of the present invention, the write gap layer 165, shown in FIGS. 1–3, may be formed over the coil 140, such as on the coil 140 prior to formation of top coat insulation layer 160, or on top coat insulation layer 160 prior to upper yoke 180 formation. The track width of the writer may be defined by etching after deposition of the upper yoke 180 material using the upper yoke 180 as a hard mask as disclosed in U.S. patent application Ser. No. 09/289, 701 incorporated by reference.

Figure 10:
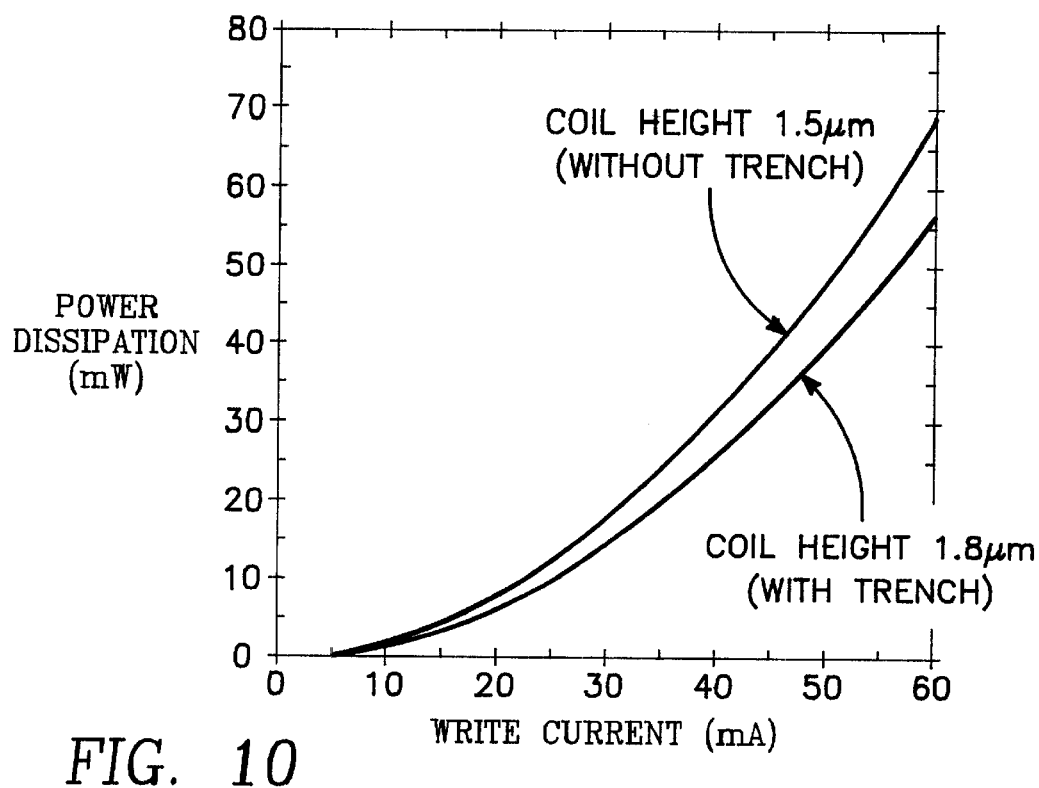
FIG. 10 is a graphical illustration comparing the effect of power dissipation as a function of write current in coils modeled with, and without, the trench of the present invention.

FIG. 10 is a graphical illustration comparing the effect of power dissipation as a function of write current for coils with, and without, the trench of the present invention. For FIG. 10, coil resistance was modeled as a function of coil height for a 9 turn coil. Without the trench and at a coil height of 1.5 microns, the coil resistance is 19.3 ohms. With an additional 0.3 micron trench, the coil resistance is reduced to 15.9 ohms. As seen from FIG. 10 power dissipation is reduced from about 48 mW to about 40 mW at 50 mA. As such, even with a small trench depth, there is much smaller power dissipation, particularly at high write current.

Figure 11:
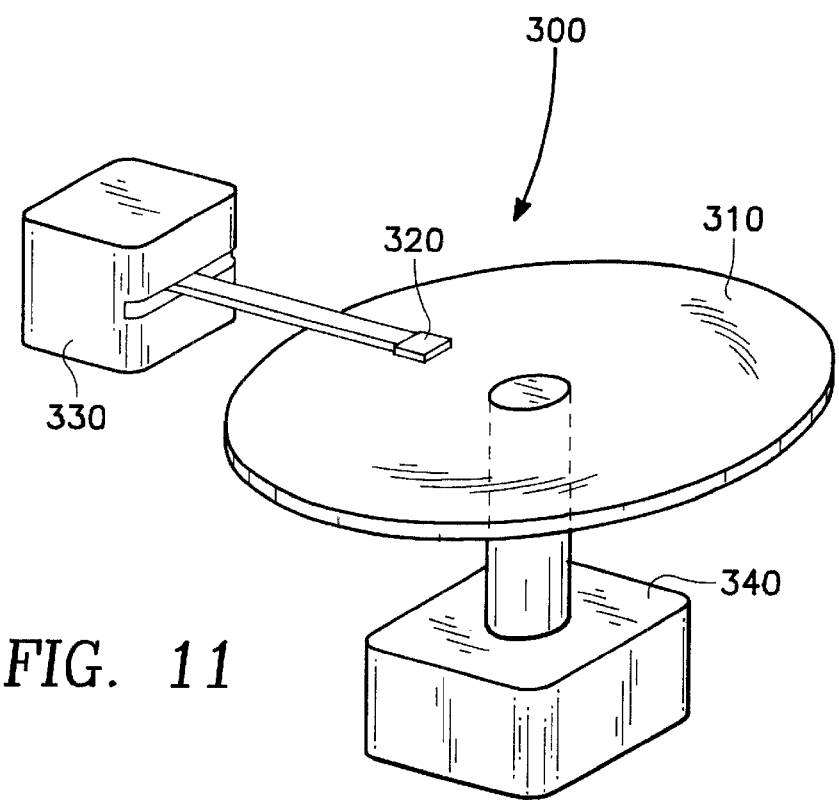
FIG. 11 is an isometric view illustrating a data storage and retrieval apparatus employing an improved thin film write head in accordance with the present invention.

Embodiments of the present invention may provide an improved data storage and retrieval apparatus as conceptually depicted in FIG. 11. FIG. 11 shows a thin film write head embodied in a disk type magnetic data storage and retrieval apparatus 300. The write head of the present invention may be located within a merged head assembly 320 which rides above a magnetic storage media 310, depicted in FIG. 11 as a rotatable hard disk type storage media. The hard disk 310 is coupled to a motor 340 to provide rotation of the disk relative to the head assembly 320. An actuating means 330 may be used to position the head assembly 320 above the surface of the media 310 to read and write data in the form of magnetic bits from and to the media 310. The data storage and retrieval apparatus 300, typically has several hard disks 310 and several corresponding head assemblies 320. The improved structure of the present invention is intended to be utilized in all known data storage and retrieval apparatuses. By way of non-exclusive example, the present invention is also intended to improve magnetic tape or stripe type storage and retrieval apparatuses, or any other known types of magnetic storage and retrieval apparatuses.

While the preferred embodiments and methods of the present invention have been described in detail above, many changes to these embodiments and methods may be made without departing from the true scope and teachings of the present invention. The present invention, therefore, is limited only as claimed below and the equivalents thereof.

We claim:

1. A thin film write head comprising:
   a lower pole including a write gap end and a back end, the lower pole being substantially planar between the two ends;
   a pole pedestal disposed over the write gap end of the lower pole and including a first substantially planar upper surface defining a plane;
   a back gap disposed over the back end of the lower pole and including a second substantially planar upper surface that is coplanar with the plane;
   an insulation layer disposed over the lower pole between the pole pedestal and back gap and including a third substantially planar upper surface that is substantially coplanar with the plane;
   an upper pole disposed over the lower pole and joined to the back gap;
   a write gap layer disposed above the pole pedestal and above the insulation layer and at least partially contacting the first and third upper surfaces and including an end proximate to the back gap; and
   a conductor coil between the lower and upper poles and at least partially disposed between the plane and the lower pole.

2. The thin film write head of claim 1 wherein the upper pole has a lower surface and the write gap layer is contiguous with the lower surface.

3. The thin film write head of claim 2 wherein the lower surface extends from an air bearing surface to the back gap.

4. The thin film write head of claim 1 wherein the insulation layer is about 1 micron thick.

5. The thin film write head of claim 1 wherein the insulation layer is formed of an inorganic material.

6. The thin film write head of claim 1 wherein the conductor coil extends about one half micron below the plane.

7. The thin film write head of claim 1 wherein the write gap layer is formed of a different material than the insulation layer.

8. A thin film write head comprising:
   a lower pole including a write gap end and a back end, the lower pole being substantially planar between the two ends;
   a pole pedestal disposed over the write gap end of the lower pole and including a first substantially planar upper surface defining a plane;
   a back gap disposed over the back end of the lower pole and including a second substantially planar upper surface that is coplanar with the plane;
   an insulation layer disposed over the lower pole between the pole pedestal and back gap and including a third substantially planar upper surface that is substantially coplanar with the plane;
   an upper pole disposed over the lower pole and joined to the back gap;
   a conductor coil between the lower and upper poles and at least partially disposed between the plane and the lower pole, and
   a write gap layer disposed above the pole pedestal and above the insulation layer and between the upper pole and the conductor coil, and further disposed between adjacent turns thereof, and at least partially contacting the first and third upper surfaces and including an end proximate to the back gap.

9. A thin film write head comprising:
   a lower pole including a write gap end and a back end, the lower pole being substantially planar between the two ends;
   a pole pedestal disposed over the write gap end of the lower pole and including a first substantially planar upper surface defining a plane;
   a back gap disposed over the back end of the lower pole and including a second substantially planar upper surface that is coplanar with the plane;
   an insulation layer disposed over the lower pole between the pole pedestal and back gap and including a third substantially planar upper surface that is substantially coplanar with the plane;
   an upper pole disposed over the lower pole and joined to the back gap;
   a conductor coil between the lower and upper poles and at least partially disposed between the plane and the lower pole, and
   a write gap layer disposed above the pole pedestal and above the insulation layer and between the lower pole and the conductor coil, and further disposed between adjacent turns thereof, and at least partially contacting the first and third upper surfaces and including an end proximate to the back gap.

10. A data storage and retrieval apparatus comprising:
   a magnetic recording media;
   a merged head assembly positioned adjacent the magnetic recording media and including
      a read sensor, and
      a write head having
         a lower pole having a write gap end and a back end, the lower pole being substantially planar between the two ends,
         a pole pedestal disposed over the write gap end of the lower pole and having a first substantially planar upper surface defining a plane,
         a back gap disposed over the back end of the lower pole and having a second substantially planar upper surface that is coplanar with the plane,
         an insulation layer disposed over the lower pole between the pole pedestal and back gap and having a third substantially planar upper surface that is substantially coplanar with the plane,
         an upper pole disposed over the lower pole and joined to the back gap,
         a write gap layer disposed above the pole pedestal and above the insulation layer and at least partially contacting the first and third upper surfaces and having an end proximate to the back gap, and
         a conductor coil between the lower and upper poles and at least partially disposed between the plane and the lower pole; and
   a motor coupled to the media so as to move the media relative with respect to the head assembly.

11. The data storage and retrieval apparatus of claim 10 wherein the upper pole has a lower surface and the write gap layer is contiguous with the lower surface.

12. The data storage and retrieval apparatus of claim 11 wherein the lower surface extends from an air bearing surface to the back gap.

13. The data storage and retrieval apparatus of claim 10 wherein the insulation layer is about 1 micron thick.

14. The data storage and retrieval apparatus of claim 10 wherein the insulation layer is formed of an inorganic material.

15. The data storage and retrieval apparatus of claim 10 wherein the conductor coil extends about one half micron below the plane.

16. The data storage and retrieval apparatus of claim 10 wherein the write gap layer is formed of a different material than the insulation layer.

17. A data storage and retrieval apparatus comprising:
   a magnetic recording media;
   a merged head assembly positioned adjacent the magnetic recording media and including
      a read sensor, and
      a write head having
         a lower pole having a write gap end and a back end, the lower pole being substantially planar between the two ends,
         a pole pedestal disposed over the write gap end of the lower pole and having a first substantially planar upper surface defining a plane,
         a back gap disposed over the back end of the lower pole and having a second substantially planar upper surface that is coplanar with the plane, an insulation layer disposed over the lower pole between the pole pedestal and back gap and having a third substantially planar upper surface that is substantially coplanar with the plane, an upper pole disposed over the lower pole and joined to the back gap, a conductor coil between the lower and upper poles and at least partially disposed between the plane and the lower pole; and a write gap layer disposed above the pole pedestal and above the insulation layer and between the upper pole and the conductor coil, and further disposed between adjacent turns thereof, and at least partially contacting the first and third upper surfaces and including an end proximate to the back gap; and a motor coupled to the media so as to move the media relative with respect to the head assembly.

18. A data storage and retrieval apparatus comprising:

a magnetic recording media;

a merged head assembly positioned adjacent the magnetic recording media and including
  a read sensor, and
  a write head having
    a lower pole having a write gap end and a back end, the lower pole being substantially planar between the two ends,
    a pole pedestal disposed over the write gap end of the lower pole and having a first substantially planar upper surface defining a plane,
    a back gap disposed over the back end of the lower pole and having a second substantially planar upper surface that is coplanar with the plane,
    an insulation layer disposed over the lower pole between the pole pedestal and back gap and having a third substantially planar upper surface that is substantially coplanar with the plane,
    an upper pole disposed over the lower pole and joined to the back gap,
    a conductor coil between the lower and upper poles and at least partially disposed between the plane and the lower pole; and
    a write gap layer disposed above the pole pedestal and above the insulation layer and between the lower pole and the conductor coil, and further disposed between adjacent turns thereof, and at least partially contacting the first and third upper surfaces and including an end proximate to the back gap; and a motor coupled to the media so as to move the media relative with respect to the head assembly.

* * * * *